E. A. THOMAS.

Improvement in Seam-Joints for Cans, &c.

No. 4,936. Reissued June 4, 1872.

WITNESSES.

John B. Devine

Walter F. Budd

INVENTOR.

Edwin A. Thomas by his atty L. Clay A. Megarg

UNITED STATES PATENT OFFICE.

EDWIN A. THOMAS, OF PHILADELPHIA, PENNSYLVANIA.

IMPROVEMENT IN SEAM-JOINTS FOR CANS, &c.

Specification forming part of Letters Patent No. 83,107, dated October 13, 1868; reissue No. 4,936, dated June 4, 1872.

*To all whom it may concern:*

Be it known that I, E. A. THOMAS, of the city and county of Philadelphia and State of Pennsylvania, have invented a new and Improved Seam-Joint for Cans and other metallic vessels; and I do hereby declare that the following is a full, clear, and exact description thereof, which will enable others skilled in the art to make and use the same, reference being had to the accompanying drawing forming part of this specification.

This invention relates to a new and improved joint or seam for joining the edges of the piece of sheet metal, which forms the body or main portion of a box or can.

The object of the invention is to obtain a side seam or joint, which may be made very expeditiously, and be perfectly tight.

Figure 1:
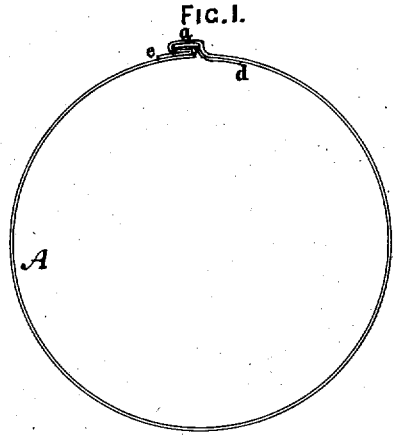
Figure 2:
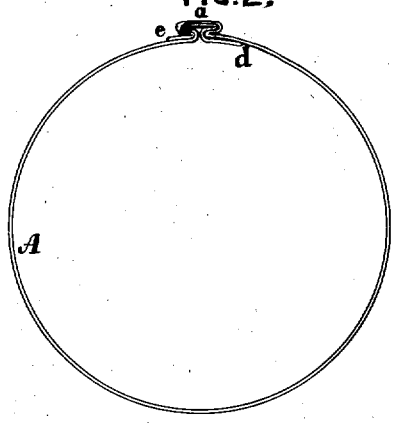
Figure 3:
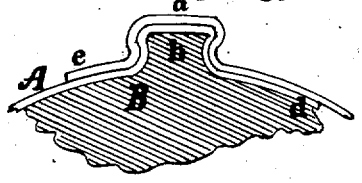

In the accompanying sheet of drawing, Figure 1 is a horizontal section of a sheet-metal can or box having my improved side seam or joint. Fig. 2 is a horizontal section of a modified form of the seam; and Fig. 3 is a horizontal section of a portion of a sheet-metal can or box showing the way in which the side seam is made.

A represents a piece of sheet metal, which is bent in cylindrical or other desired form around what may be termed a former, B. This piece of metal A forms the body of the can or box, and its edges are lapped one over the other. The lapped portions are swaged over a rib, *b*, on the former B, so as to form a raised loop or projection, *a*, extending the whole length of the can-body A, as shown in Fig. 3. After the projection *a* is formed, the former B is moved so as to leave the projection *a* of the can-body A on a smooth part of B, and the projection *a* is flattened down so as to effectually close the joint, as shown in Figs. 1 and 2. The seam thus produced consists of six thicknesses of metal, and has one end, *d*, of the strip of metal A free on the inside beyond the seam, and the other end, *e*, free on the outside of the can-body. The only difference between the seams shown in Figs. 1 and 2 consists in the direction in which the loop or projection has been flattened. In Fig. 1 it has flattened entirely on one side, and in Fig. 2 it has been spread equally on both sides. The result is the same in either case in producing a seam composed of six thicknesses of metal, and with any superfluous metal disposed of in the free ends *d* and *e*.

By these means a tight side seam or joint for sheet-metal cans is expeditiously and perfectly made at a less expense than those previously used in the manufacture of sheet-metal can-bodies.

Having thus described my invention, what I claim as new, and desire to secure by Letters Patent, is—

A side seam or joint for sheet-metal boxes or cans, having free projecting ends, and consisting of six thicknesses of metal formed by lapping the ends, then bending them into a projection, and finally flattening the projection down against the can-body, substantially as described.

EDWIN A. THOMAS.

Witnesses:
WM. B. DAYTON,
S. LLOYD WIEGAND.